(12) United States Patent
Itou

(10) Patent No.: US 6,418,900 B2
(45) Date of Patent: Jul. 16, 2002

(54) AIR INDUCTION SYSTEM FOR ENGINE

(75) Inventor: Atsushi Itou, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/820,859

(22) Filed: Mar. 30, 2001

(30) Foreign Application Priority Data

Mar. 31, 2000 (JP) ....................................... 2000-097756

(51) Int. Cl.[7] ............................................... F02M 35/10
(52) U.S. Cl. ............................ 123/184.59; 123/184.57
(58) Field of Search .................. 123/184.59, 184.57, 123/184.56, 184.53, 184.38

(56) References Cited

U.S. PATENT DOCUMENTS 4,977,865 A * 12/1990 Hiraoka et al. ......... 123/184.36
5,632,239 A * 5/1997 Patyi et al. ............. 123/184.36

FOREIGN PATENT DOCUMENTS

JP  60-169627  3/1985
JP  4-36021  * 2/1992

* cited by examiner

*Primary Examiner*—Noah P. Kamen
(74) *Attorney, Agent, or Firm*—Burns, Doane, Swecker & Mathis, LLP (57) ABSTRACT

A air induction system actuates two variable mechanisms by the resonant supercharging and a volume variable mechanism of the air induction system by a common drive means in order to reduce the manufacturing cost and to improve the output performance in the broader range of the engine speed. The air induction system includes a plurality of independent air intake passages for supplying the induction air to each engine cylinder which are sorted into two air intake passage groups, an air expanding chamber being in communication with the air intake passage groups, a first switching valve for controlling the communication between the air expanding chamber, two branch passages for supplying the induction air into the air expanding chambers, a volumetric chamber, and a second switching valve for controlling the communication between the volumetric chamber and the branch passages, an actuator for driving the first and second switching valves. The first and second switching valves are controlled to be opened and closed in accordance with the engine speed range.

8 Claims, 9 Drawing Sheets

AIR INDUCTION SYSTEM FOR ENGINE

RELATED INVENTION

This application is based on and claims priority under 35 U.S.C.§119 with respect to Japanese Application No. 2000-097756 filed on Mar. 31, 2000, the entire content of which is incorporated herein by reference.

BACKGROUND OF THE INVENTION

1. Field of the Invention

The present invention generally relates to air induction systems. More particularly, the present invention pertains to an air induction system having a variable air induction mechanism varying characteristics of the air induction system and a variable volumetric mechanism in order to obtain the dynamic effects of the induction air.

2. Background of the Related Arts

Conventionally known air induction systems supercharge the induction air, improve the charging efficiency to fill the engine combustion chamber with the induction air, and improve the output performance of the engine by utilizing dynamic effects of the induction air supplied to the combustion chamber of the engine. Generally; the dynamic effects of the induction air utilized in the air induction system of the engine includes the inertia effect and the resonance effect. Supercharging effects due to the inertia effect and the resonance effect can be obtained when the engine rpm and the natural frequency of the air induction system are synchronized. The natural frequency is determined by the length and the sectional area of the air intake passage, and the average volume during the air intake period. It is known that the engine rpm and the natural frequency of the air intake system are synchronized by reducing the sectional area of the air intake passage and by expanding the length of the air intake passage at lower engine speed range. The engine rpm and the natural frequency of the air intake system are also synchronized by enlarging the sectional area of the air intake passage and by shortening the length of the air intake passage at higher engine speed. Accordingly, in general, the range of the engine rpm for obtaining the supercharging effects by the dynamic effects of the induction air is broadened by air induction systems provided with mechanisms varying the length of the air intake passage and the volume of plenum.

Japanese Patent Laid-Open Publication No. S60-169627 discloses a variable air induction system utilizing the foregoing effects. The air induction system according to the aforementioned prior art includes an air intake passage having two branch passages diverged at a predetermined diverging portion, an air expanding chamber provided on the downstream side of the branch passages, and a plurality of independent air intake passages for respective cylinders whose order of air induction does not overlap one another. The air induction system according to the aforementioned prior art further includes a first bypass for communicating two air expanding chambers, and a second bypass for communicating two branch passages at a position between the diverging portion and the air expanding chamber. The air induction system according to the aforementioned prior art further includes first and second switching valves for opening and closing the first and second bypasses respectively in accordance with the rpm of the engine. Thus, the air induction system according to the aforementioned prior art is capable of changing the frequency by which the inertia effects and the resonance effects can be obtained by varying the volume of the air expanding chamber and the length of the air intake passage by controlling the opening and closing of the first and second switching valves provided in the branch passages and the air expanding chamber in accordance with the engine rpm.

It is also known that the output performance of the engine at higher speed ranges is improved by expanding the volume of the plenum downstream of the throttle valve provided on the air induction system of the engine. When the engine revolves at high speed, the amount of the induction air required in the combustion chamber is increased. This brings the necessity to supply the induction air in a larger amount than the volume of the air induction system of the engine. As a result, the induction air is introduced from an end of the air induction system exposed to the atmosphere. In a four-cycle engine, for instance, pistons are descended during the intake stroke period and the pistons work in order to intake the induction air to the combustion chamber. Since the induction air is introduced from the end of the air induction system exposed to the atmosphere, the induction air enters a complicatedly structured air induction system structured in order to obtain the inertia effect and the resonant effect. This causes a very large resistance to the induction air. In this case, the work by the pistons is reduced in accordance with the resistance caused by the flow of the induction air and not all work of the pistons is used for intaking the induction air (that is called pumping losses). That is, the power of the pistons is declined. Provided that the volume of the air induction system can be enlarged when the engine is at the high rpm range, the necessary volume of the induction air for combustion can be supplied to the combustion chamber from the air induction system (not from the end of the air induction system exposed to the atmosphere). Thus, the work of piston in order to intake the induction air to the engine can be reduced to supply the larger amount of the induction air to the combustion chamber and to improve the output performance of the engine.

In the aforementioned prior art, the use of a plurality of switching valves is necessary in order to control the communication of the air intake passages and a plurality of the drive means, and control means are necessary for operating the switching valves. Hence, the number of members comprising the switching valve and the drive means is increased as well as the assembling time due to a complicated structure, which increases the manufacturing cost. In addition, it is difficult to arrange all members in a limited space of the engine compartment.

In the aforementioned prior art, the volume of the air induction system cannot be expanded. When the volume of the air induction system downstream of the throttle valve is expanded, another problem arises, i.e., the delay of the response of engine at lower and middle engine speed range. The output of the engine is variably controlled in accordance with the amount of the induction air introduced into the air intake passages by the increase and decrease of the sectional area of the air intake passages caused by the opening and closing of the throttle valve operated in accordance with the operation of throttle pedal. Since the induction air increased by the opening of the throttle valve is first supplied to the combustion chamber of the engine after fulfilling the volume of the air induction system downstream of the throttle valve when the volume of the air intake passage at the downstream of the throttle valve is large, a lag between the operation of the throttle pedal by the vehicle driver and the increase of the engine output is created. The lag makes the driver feel that the engine response is slow.

According to the aforementioned reason, it is favorable that the volume of the air intake passage be increased only at the higher speed range of the engine. However, in order to achieve this goal, another pair of air expanding chambers, switching valves, drive means, and control means are necessary to be provided to the air induction system. The air induction system would also need to have a structure capable of controlling the communication between the air induction system and the additional air expanding chamber. Since the structure according to the foregoing condition is further complicated compared to the aforementioned prior art, it is difficult to achieve the goal.

SUMMARY OF THE INVENTION

In light of the foregoing, it is an object of the present invention to provide an air induction system which is capable of improving the performance at broader range of engine speed with low manufacturing cost and simple structure.

To attain the above object, the following technical means is provided with the air induction system of the present invention which includes a plurality of independent air intake passages in communication with respective cylinders of the engine for supplying air thereto, a surge tank connected to the independent air intake passages for supplying the induction air to the air intake passages, an air induction passage having first and second branch passages each exposed to the atmosphere at one end and connected to the surge tank at another end for introducing the induction air into the surge tank, and a volumetric chamber disposed between the branch passages. The air induction system further includes a first switching valve disposed in the surge tank for selectively interrupting and establishing fluid communication between first and second sections of the surge tank, and a second switching valve separating the volumetric chamber from the first and second branch passages for selectively interrupting and establishing fluid communication between the volumetric chamber and the first and second branch passages. The first and second switching valves being operated by a common drive mechanism in accordance with the magnitude of the engine speed.

According to the foregoing technical means, by providing the volumetric chamber between the branch passages, the volume of the air induction system can be varied to improve the output performance of the engine at the higher speed range. Further, by the function of the second switching valve for controlling the communication between the branch passages and the volumetric chamber, the volumetric chamber can be used only when the expansion of the volume of the air intake passage is necessary at a higher engine speed range and not used when the engine response is delayed by the expanded volume of the air intake passages such as at a lower and a middle engine speed range. Accordingly, both the improvement of the engine output performance and an assurance of good response can be achieved. Further more, since the first and the second switching valves can be operated by a common drive means, the number of the switching valves can be increased without increasing the number of drive means and control means. Thus, the manufacturing cost can be reduced and a simple structure can be achieved.

It is favorable that the second switching valve comprises a rotary switching valve formed with two openings in a hollow cylinder and the hollow portion of the rotary switching valve forms the volumetric chamber.

It is further favorable that a first shaft is formed on the first switching valve and is connected to the drive means, a second shaft is formed on the second switching valve, and a transmitting portion is provided between the first and the second shafts for transmitting the rotation force of the drive means while providing phase-contrast between the first and the second shafts. A biasing means opposes the rotational force provided to the second switching valve by the drive means, and a stopper blocks the rotation of the second switching valve from exceeding a predetermined angle of movement. It is favorable that the air induction system of the present invention is structured to have different periods for opening and closing the first and the second switching valves.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF A PREFERRED EMBODIMENT OF THE INVENTION

An embodiment of the present invention of the air induction system will be explained referring to FIGS. 1 through 17.

Figure 1:
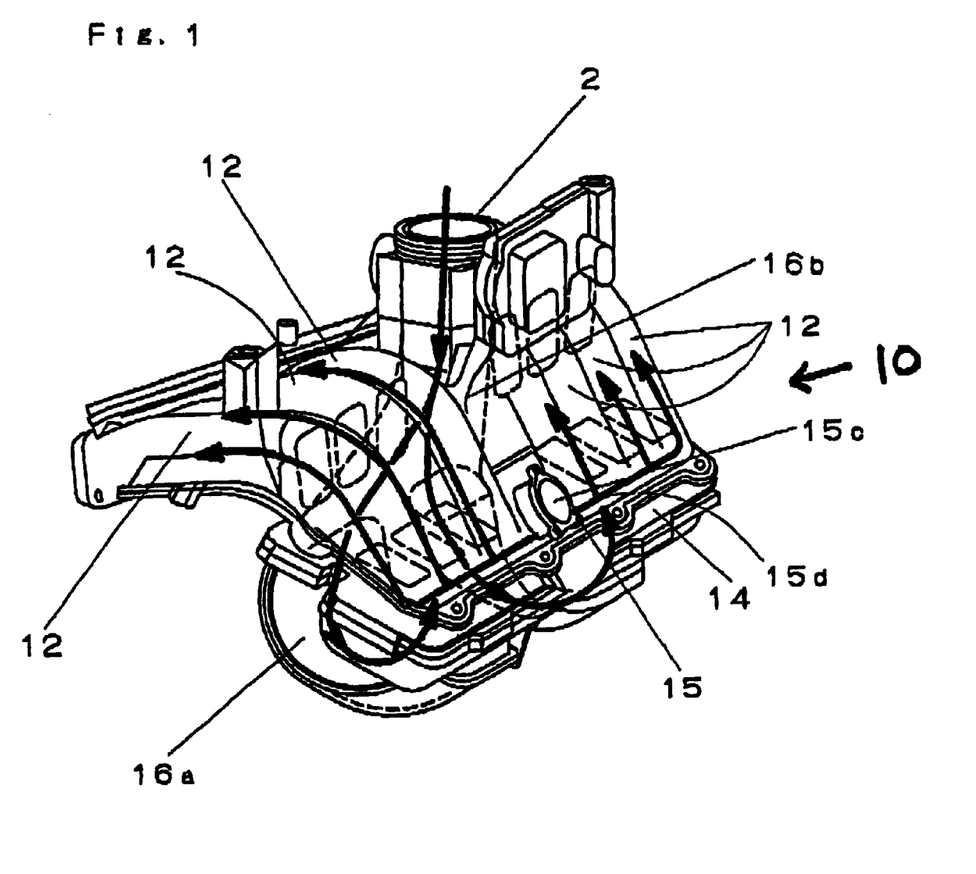
FIG. 1 is a perspective view of an air induction system of an engine of the embodiment according to the present invention.

Referring to FIG. 1, a throttle body 2 for controlling the amount of the induction air flowing in an air induction system 10 is mounted on the most upstream portion of the air induction system. Branch passages 16a, 16b dividing an air intake passage into two passages are provided downstream of the throttle body 2. The first and second branch passages 16a, 16b are in communication with a surge tank 14 functioning as an air expanding chamber. A plurality of independent air intake passages 12 for supplying the induction air to a combustion chamber of respective cylinders (not shown) of the engine 1 are connected to the surge tank 14. A control valve unit 15 is provided which a includes hollow cylindrical housing 15e with a bottom at one end and which further includes a first switching valve 20 and a second switching valve 30 disposed in the housing. The control valve unit 15 is formed on the surge tank 14 and extends into a space disposed between the first branch passage 16a and the second branch passage 16b in a direction perpendicular to the longitudinal direction of the surge tank 14. An opening 15c of the housing 15e is provided in a flange portion 15d formed on the peripheral surface of the surge tank 14, the opening 15c receiving an actuator (driving means) 3 (shown in FIG. 4). After the first and second switching valves 20, 30 are arranged in respective predetermined positions in the control valve unit, the actuator 3 is then fixed to the flange portion 15d.

Figure 2:
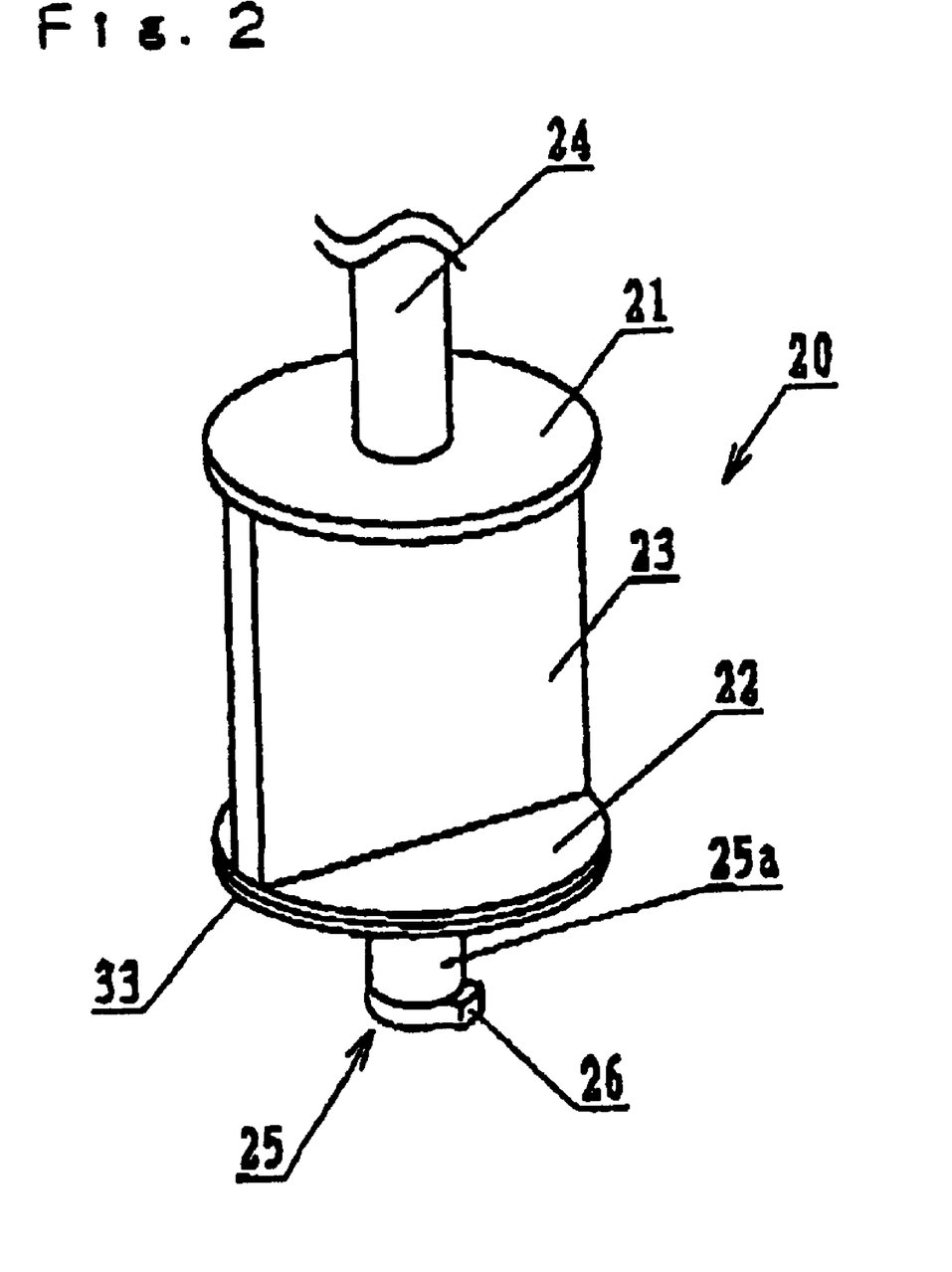
FIG. 2 is a perspective view of a second switching valve of the embodiment according to the present invention.

FIG. 2 shows a perspective view of the first switching valve 20 of the embodiment of the present invention.

As shown in FIG. 2, the first switching valve 20 includes a first and a second disc member 21, 22 positioned in parallel maintaining a predetermined distance, and a rectangular valve portion 23 therebetween. The width of the rectangular valve portion 23 is equal to the distance between the first and the second disc members 21, 22 and the length thereof is equal to the diameter of the first and the second disc members 21, 22. A first shaft 24 projects from the first disc member 21 and is connected to the actuator 3. The second disc member 22 is provided with a first transmitting shaft 25. The first transmitting shaft 25 includes a cylindrical shaft portion 25a and a lug 26 projecting in a radial outward direction. The second disc member 22 is provided with a seal member 33 on the circumferential surface. The seal member 33 maintains an airtightness of the first switching valve 20 by contacting the interior surface of the housing 15e when the first switching valve 20 is inserted into the housing 15e.

Figure 3:
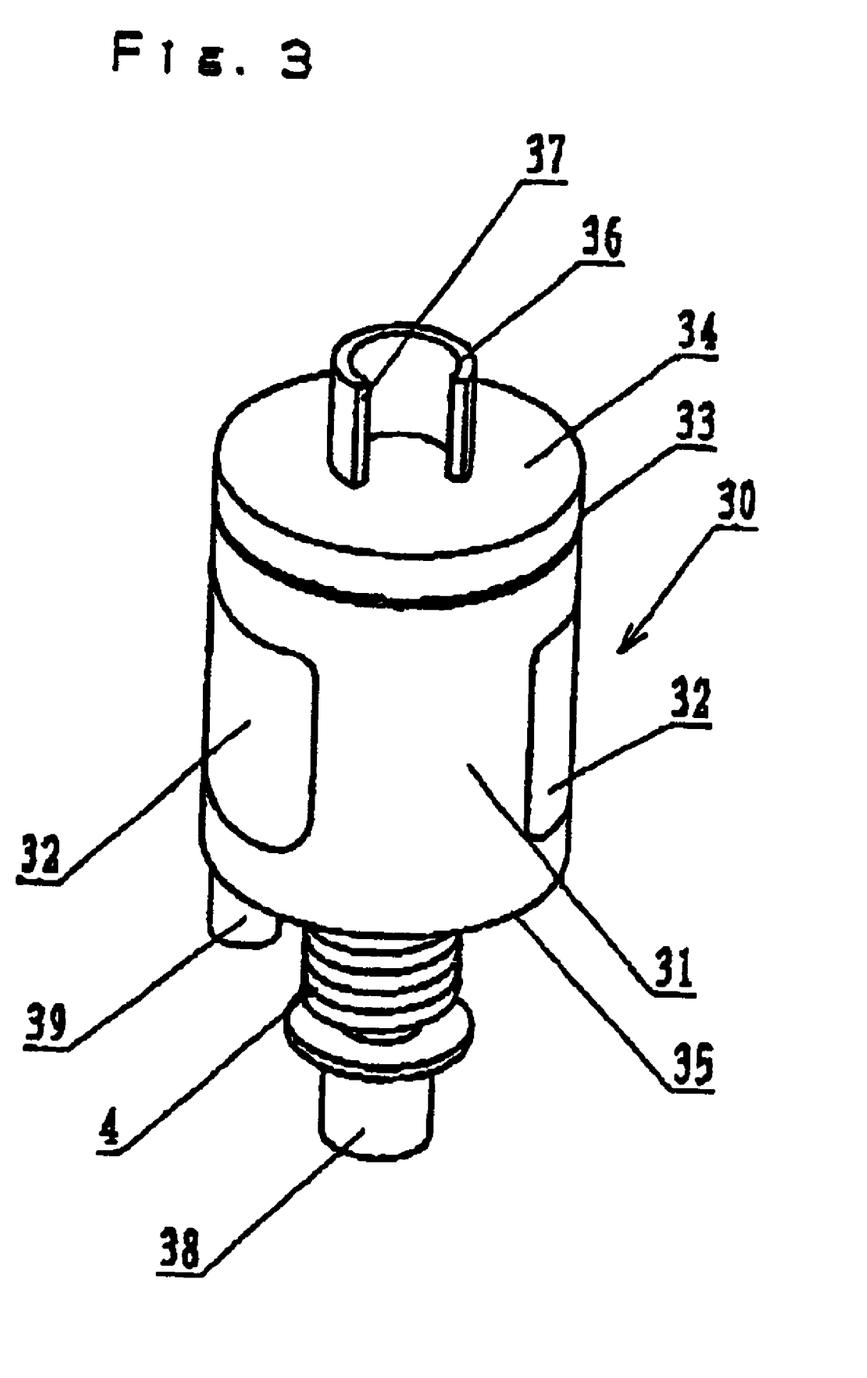
FIG. 3 is a perspective view of a first switching valve of the embodiment according to the present invention.

FIG. 3 is a perspective view of the second switching valve 30 of the embodiment of the present invention.

As shown in FIG. 3, the second switching valve 30 includes a cylinder 30a having a pair of openings 32 arranged in a circumferential surface 31 symmetrically relative to a central axis of the cylinder. The cylinder 30a has a hollow cylindrical shape with bottoms at both ends. A second transmitting shaft 36 projects from a bottom surface portion 34 which is adjacent to the first switching valve 20 (shown in FIG. 2) and opposing the first transmitting shaft 25 (shown in FIG. 2). As shown in FIG. 3, the second transmitting shaft 36 having an incomplete cylindrical shape forms a contacting portion 37 on the circumferential end surface. The contacting portion 37 transmits rotational force by contacting the convex portion of the first transmitting shaft 25 (shown in FIG. 2). A second shaft 38 of the switching valve 30 is inserted into a bearing 15b (shown in FIG. 4) of the control valve housing 15e for rotatably supporting the second switching valve 30. A stopper 39 is provided on the bottom of the switching valve 30 for preventing rotation of the second switching valve 30 by contacting a stopper supporting portion 15a (shown in FIG. 4) provided on the bottom portion of the control valve housing 15e. The second switching valve 30 is provided with a return spring (biasing means) 4 for providing a biasing force opposing the rotational direction to the second switching valve 30 when the second switching valve 30 is rotated by the actuator 3, for example a motor.

The circumferential surface 31 of the second switching valve 30 is provided with another seal member 33 for sealing the second switching valve 30 by contacting the interior peripheral surface of the control valve housing 15e.

Figure 4:
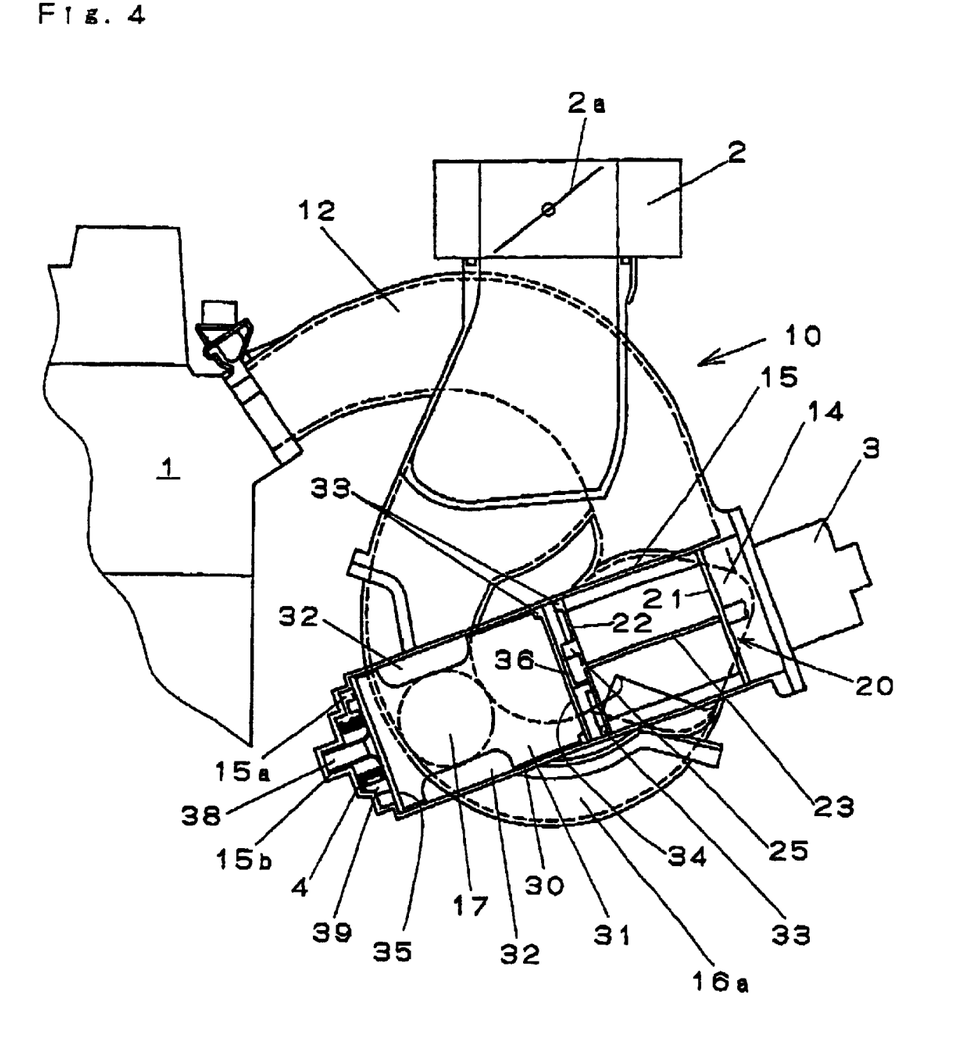
FIG. 4 is a cross sectional view of the air induction system of the embodiment according to the present invention.

FIG. 4 is a sectional view of the air induction system of the embodiment of the present invention shown in FIG. 1.

Referring to FIG. 4, communication between the first and second branch passages 16a and 16b and the control valve unit 15 disposed therebetween is established by a communication portion 17. The communication between the control valve unit 15 and the first and second branch passages 16a, 16b is established by keeping the position of the opening portions 32 aligned with the opening of the communication portion 17 by rotating the second switching valve 30 driven by the actuator 3.

The control valve unit 15 is also in communication with the surge tank 14. The first switching valve 20 is provided at a location where the control valve unit 15 and the surge tank 14 are in communication. The first switching valve 20 is rotated by the actuator 3 selectively to a position where the surge tank 14 functions as a single air expanding chamber, and a position where the surge tank 14 functions as first and second air intake passages.

The stopper supporting portion 15a projecting from the bottom of the control valve housing 15e prevents a further rotation of the second switching valve 30 by contacting the stopper 39 of the second switching valve 30 when the second switching valve 30 is rotated to a predetermined angle. The bearing 15b is formed on the bottom of the control valve housing 15e and receives the second shaft 38 of the second switching valve 30. The first shaft 24 of the first switching valve 20 is connected to the actuator 3. The first switching valve 20 and the second switching valve 30 are connected via the first transmitting shaft 25 and the second transmitting shaft 36 for transmitting the rotational force of the actuator 3. The first switching valve 20 and the second switching valve 30 are rotatably supported by the actuator 3 and the bearing 15b.

The seal members 33 provided on the disc members 21, 22 of the first switching valve 20 and on the bottom portion 34 of the second switching valve 30 blocks communication between the surge tank 14 and the branch passages 16a, 16b via the control valve unit 15 by contacting the interior circumferential surface of the control valve housing 15e.

Figure 5:
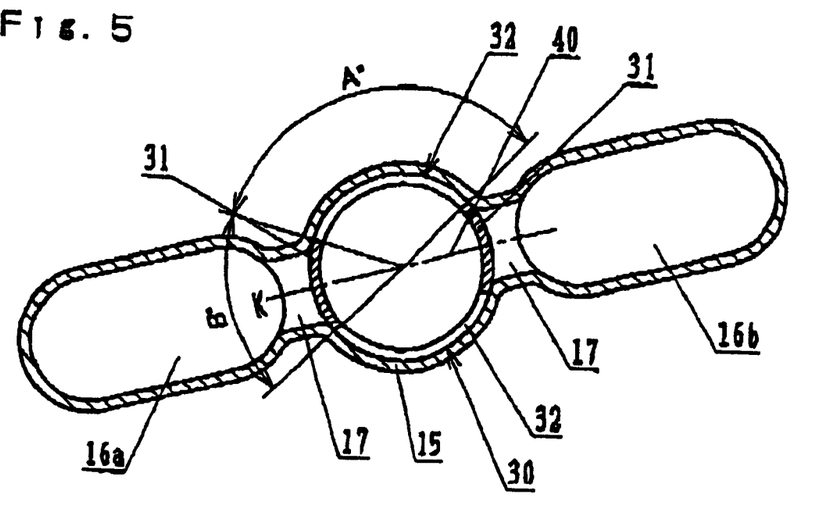
FIG. 5 is a cross sectional view showing a first switching mode of the second switching valve of the embodiment according to the present invention.
Figure 6:
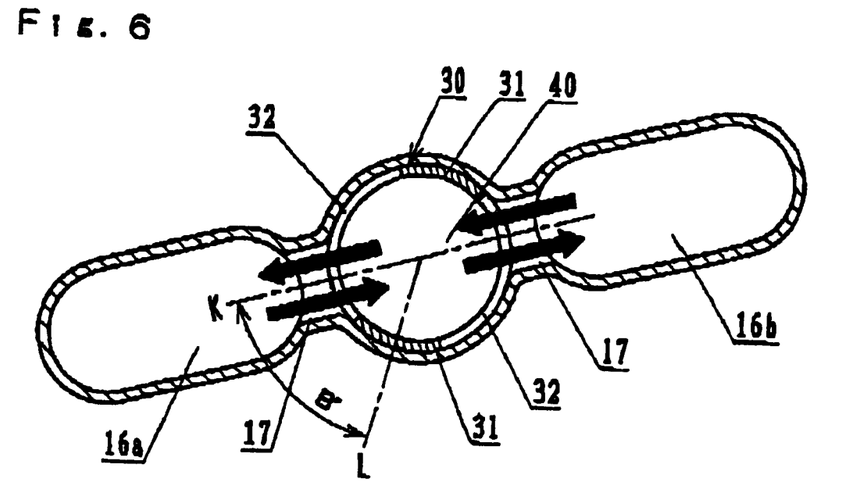
FIG. 6 is a cross sectional view of a second switching mode of the second switching valve of the embodiment according to the present invention.
Figure 7:
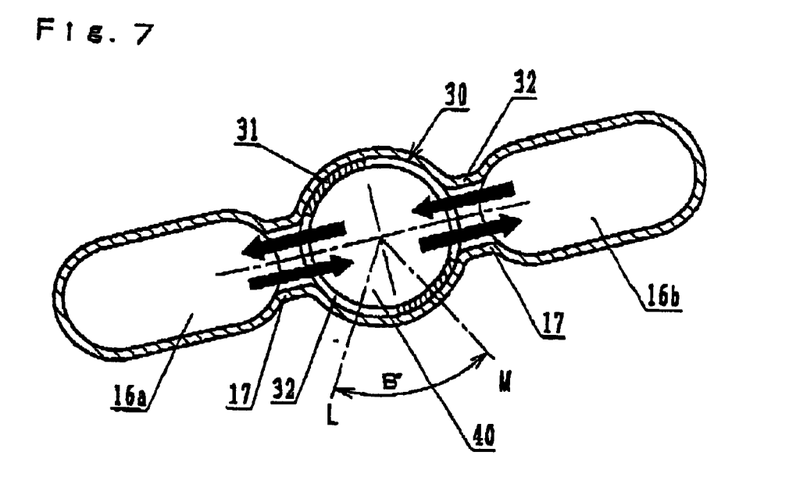
FIG. 7 is a cross sectional view of a third switching mode of the second switching valve of the embodiment according to the present invention.

FIGS. 5–7 are sectional views of the attaching portion of the second switching valve of the embodiment of the present invention. FIG. 5 shows a first switching position, FIG. 6 shows a second switching position, and FIG. 7 shows a third switching position of the second switching valve 30.

Referring to FIGS. 5–7, the communication portion 17 and the second switching valve 30 are provided between the first branch passage 16a and the second branch passage 16b. The cylinder 30a of the second switching valve 30 includes an inner chamber 40, hereinafter referred to as a volumetric chamber. When the two openings 32 formed in the second switching valve 30 become aligned with the communication portion 17 upon rotation of the second switching valve 30 by the actuator 3, a further air expanding chamber is defined by the volumetric chamber 40 due to the communication established between the first branch passage 16a and the second branch passage 16b (via the volumetric chamber 40 and the communication portion 17). Thus, the volume of the air intake system is increased by an amount equal to the volume of the volumetric chamber 40. Each of the openings 32 has an arc shape (see FIG. 5) whose angular length corresponds to a central angle A. The openings 32 are spaced apart by a portion of the circumferential surface 31 having another arc shape whose angular length corresponds to a central angle B. It is favorable that A=120° and B=60°.

The second switching valve 30 is maintained at a first (closed) switching position (position K) in FIG. 5. The first switching position corresponds to the initial attaching position when no rotational force is applied by the actuator 3.

Referring to FIG. 5, since the openings 32 of the second switching valve 30 are maintained at a position non-aligned with the communication portion 17, the communication portion 17 is closed by the circumferential surface 31 of the second switching valve 30. Consequently, the branch passage 16a and the branch passage 16b function as independent passages respectively.

Referring to FIG. 6, the second switching valve 30 is maintained at a second (open) switching position (position L) after being rotated by angle B from the position K of FIG. 5 by the actuator 3. The openings 32 and the communication portion 17 are maintained in alignment with each other to establish communication between the first branch passage 16a and the second branch passage 16b via the volumetric chamber 40 and the communication portion 17.

The second switching valve 30 is maintained at a third (open) switching position (position M) after being rotated by the angle B from the L position by the actuator 3 in FIG. 7. When the second switching valve 30 is rotated by the actuator 3, the openings 32 is rotated. However, since the openings 32 are still maintained at a position aligned with the communication portion 17, the communication between the first and the second branch passages is maintained via the volumetric chamber 40.

Figure 8:
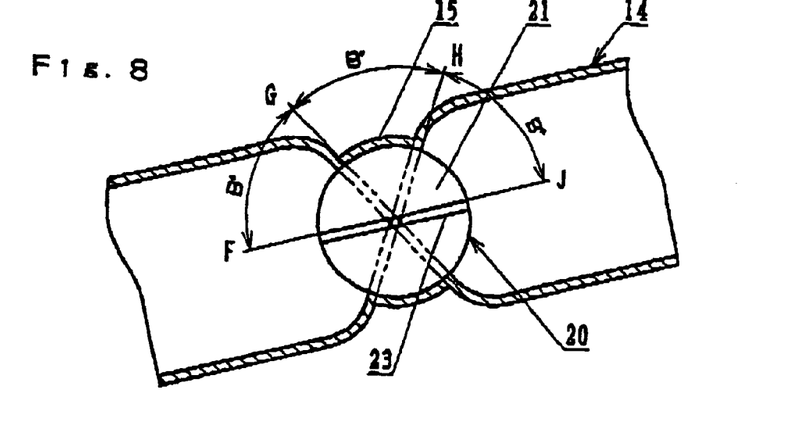
FIG. 8 is a cross sectional view showing first through fourth switching modes of the first switching valve of the embodiment according to the present invention.

FIG. 8 is a sectional view of the attaching portion of the first switching valve 20 of the embodiment of the present invention. Position F corresponds to a first switching position, position G corresponds to a second switching position, position H corresponds to a third switching position, and position J corresponds to a fourth switching position of the first switching valve.

As shown in FIG. 8, the surge tank 14 is provided with the control valve unit 15. The first switching valve 20 is disposed in the control valve housing 15e. The first switching valve 20 is rotated by the actuator 3 to a position where the surge tank 14 functions as first and second air intake passages, or to a position where the surge tank 14 functions as a single air expanding chamber. When the surge tank 14 functions as two air intake passages, the independent air intake passages 12 are divided into two cylinder groups which do not have their intake periods overlapping.

The first switching position F of FIG. 8 (solid lines) corresponds to the initial attaching position of the first switching valve 20 (before the rotational force of the actuator 3 is transmitted). The valve portion 23 is maintained in a state (opening condition) where the communication of the surge tank 14 in the control valve unit 15 is not disturbed, to enable the surge tank 14 to function as a single air expanding chamber. Position G corresponds to the second switching position after the valve portion 23 has been rotated by the angle B from the F position by the actuator 3. At the second switching position G, since the valve portion 23 interrupts the communication between two separate portions 14a, 14b of the surge tank 14 (closed condition), the surge tank 14 is divided into two chambers functioning as first and second air intake passages, respectively. Position H corresponding to the third switching position shows the condition after the valve portion 23 of the surge tank 14 has been rotated by the angle B from the position G by the rotational force of the actuator 3. Since the valve portion 23 is in a closed condition, the surge tank 14 is divided into two chambers as mentioned above. Position J corresponding to the fourth switching position occurs after the valve portion 23 has been rotated by the angle B from the position H. As shown in FIG. 8, the valve portion 23 is placed in the same position as the initial attaching position (the first switching position) shown as the position F because now the portion 23 will have been rotated by 180 degree from the first switching position. At the fourth switching position, the valve 23 is maintained in an open condition to establish a communication between the surge tank portions 14a, 14b to make the surge tank function as a single air expanding chamber.

FIGS. 9–12 show a sectional view of the first transmitting shaft 25 and the second transmitting shaft 36 of the embodiment of the present invention and the respective operation conditions when the first transmitting shaft 25 is rotated by the actuator 3.

Figure 9:
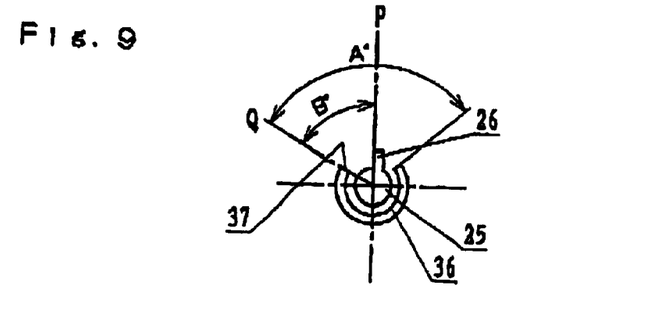
FIG. 9 is a cross sectional view showing a first operation position of a transmitting portion of the embodiment according to the present invention.

FIG. 9 shows the condition that the first transmitting shaft 25 and the second transmitting shaft 36 are located at respective initial attaching positions, i.e., position P and position Q, respectively. The second transmitting shaft 36 has a hollow cylindrical shape in which there is formed a recess of an angular length A. The second transmitting shaft 36 telescopingly receives the shaft portion 25a of the first transmitting shaft 25, which portion 25a has a smaller outside diameter than the inside diameter of the hollow cylinder of the second transmitting shaft 36. The lug 26 provided on the first transmitting shaft 25 is spaced from the contacting portion 37 of the recess by angle B when the lug 26 is at the midpoint of the recess. As noted earlier, it is favorable if the angle A is 120° and the angle B is 60°.

Figure 10:
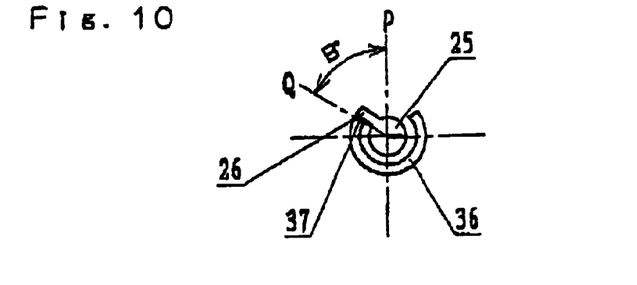
FIG. 10 is a cross sectional view showing a second operation position of the transmitting portion of the embodiment according to the present invention.

FIG. 10 shows the condition that the first transmitting shaft 25 and the lug 26 are rotated by the angle B to the second operation position (the position Q). The lug 26 contacts the contacting portion 37 of the recess portion of the second transmitting shaft 36. The actuator 3 only rotates the shaft 25 by angle B, so the shaft 36 is not caused to rotate. Accordingly, the second transmitting shaft 36 is maintained at the initial attaching position (position Q).

Figure 11:
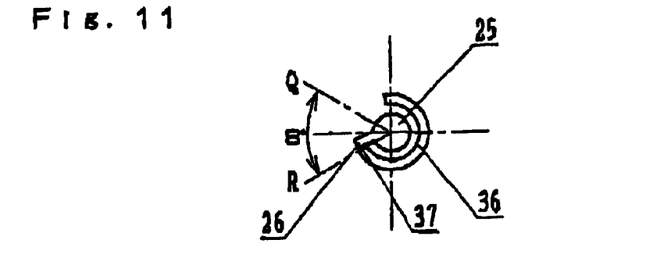
FIG. 11 is a cross sectional view showing a third operation position of the transmitting portion of the embodiment according to the present invention.

FIG. 11 shows the condition that the first transmitting shaft 25 and the lug 26 are rotated by a further angle B to be moved to the third operation position (position R) by the actuator 3. The lug 26 contacts the contacting portion 37 of the second transmitting shaft 36 to rotate the second transmitting shaft 36 by the angle B.

Figure 12:
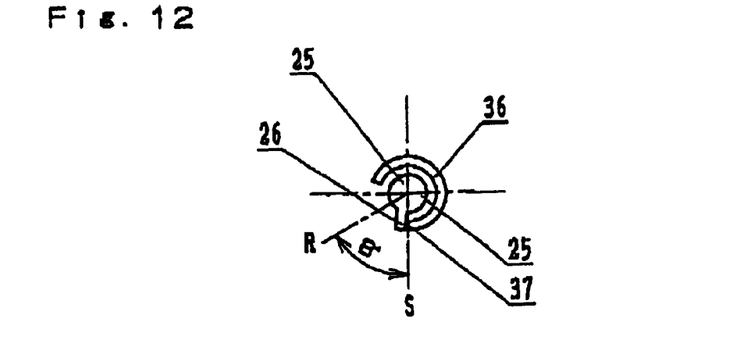
FIG. 12 is a cross sectional view showing a fourth operation position of the transmitting portion of the embodiment according to the present invention.

In FIG. 12, the shaft 25 and lug 26 have been rotated by an additional angle B, thereby also rotating the shaft 36 by an additional angle B, to position S.

FIGS. 13–16 are schematic views of the air induction system of the embodiment of the present invention showing the condition of the first and the second switching valves 20, 30 and the characteristic relationship of the air induction system.

Figure 13:
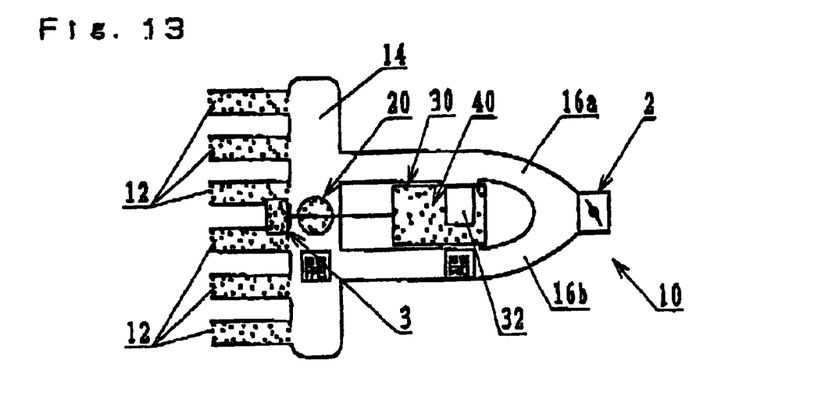
FIG. 13 is a schematic view of the air induction system of which the first and second switching valves are controlled in order to have characteristics during lower engine speed range.
Figure 14:
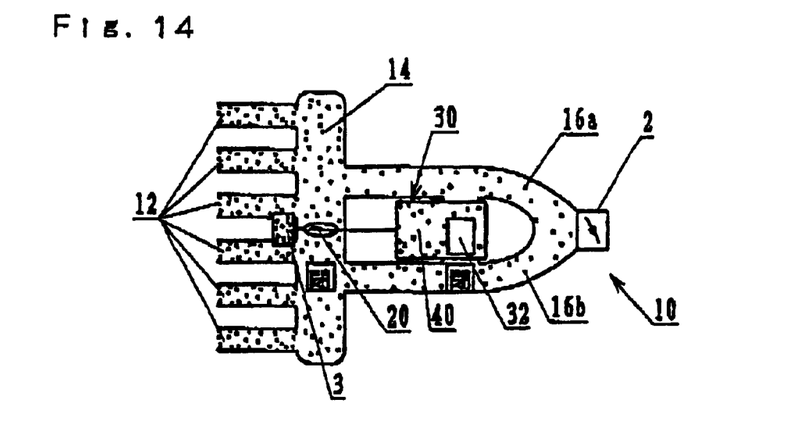
FIG. 14 is a schematic view of the air induction system of which the first and second switching valves are controlled to have characteristics during mid-low engine speed range.
Figure 15:
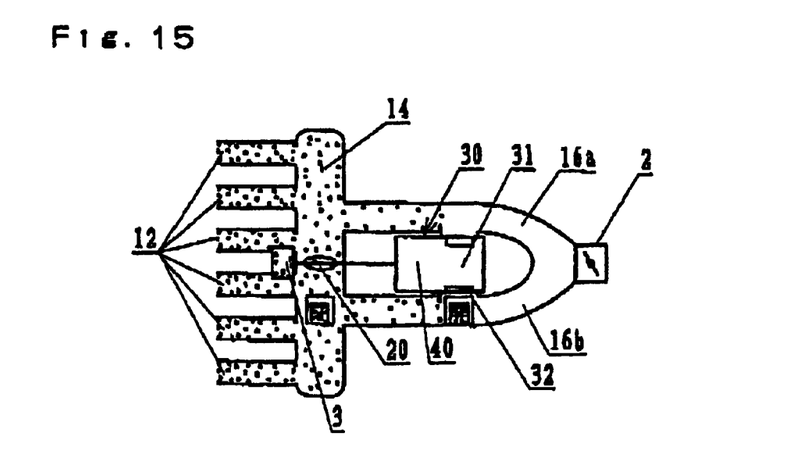
FIG. 15 is a schematic view of the air induction system of which the first and second switching valves are controlled to have characteristics during mid-high engine speed range.
Figure 16:
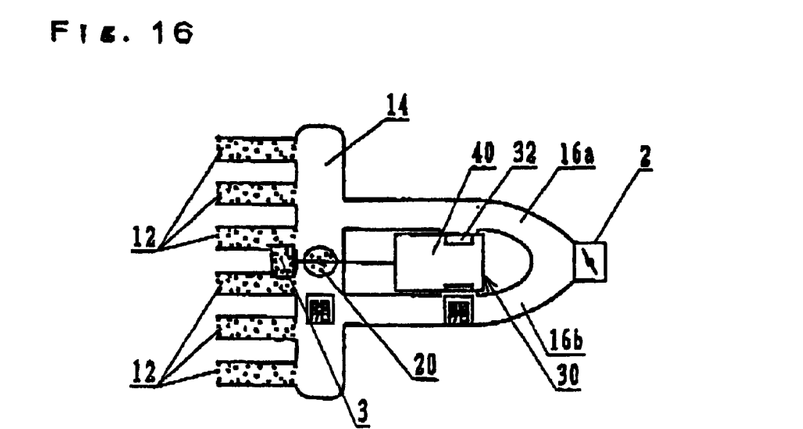
FIG. 16 is a schematic view of the air induction system of which the first and second switching valves are controlled to have characteristics during higher engine speed range.

In FIG. 13, the first switching valve 20 and the second switching valve 30 are positioned at the first switching position corresponding to the initial attaching position, i.e., a closed position K for valve 30, and an open position F for valve 20. In consequence, the air induction system has a first natural frequency formed by the branch passages 16a, 16b, the surge tank 14 (functioning as the single air expanding chamber), and the independent air intake passages 12. FIG. 14 shows the condition that the first switching valve 20 is at the second switching position G, the second switching valve 30 is still at the first switching position K, and thus both of the first and second switching valves 20, 30 are closed. According to this condition, the independent air intake passages 12 are divided into two groups in which the intake stroke of each passage keeps equal interval and the intake strokes of the independent air intake passages 12 do not overlap one another. As the result, the air induction system has a second natural frequency. FIG. 15 shows the condition that the first switching valve 20 is at the third switching position H, and the second switching valve 30 is at the second switching position L, whereby the first switching valve 20 is closed, and the second switching valve 30 is open. In this condition, the independent air intake passages 12 are kept divided into two groups in which the intake strokes of the passages keep equal interval and do not overlap one another and the air intake system has a third natural frequency higher than the second natural frequency. In this condition, the volumetric chamber 40 and upstream portions of the branch passages 16a, 16b function as an air expanding chamber. FIG. 16 shows the condition that the first switching valve 20 is at the fourth switching position J, and the second switching valve 30 is at the third switching position M, and thus the first and the second switching valves 20, 30 are open. The air induction system has a fourth natural frequency formed by the surge tank 14 (functioning as the single air expanding chamber), the volumetric chamber 40 and two branch passages 16a, 16b. The expanded volume equals the total volume of the surge tank 14, the volumetric chamber 40, and the two branch passages 16a 16b.

Figure 17:
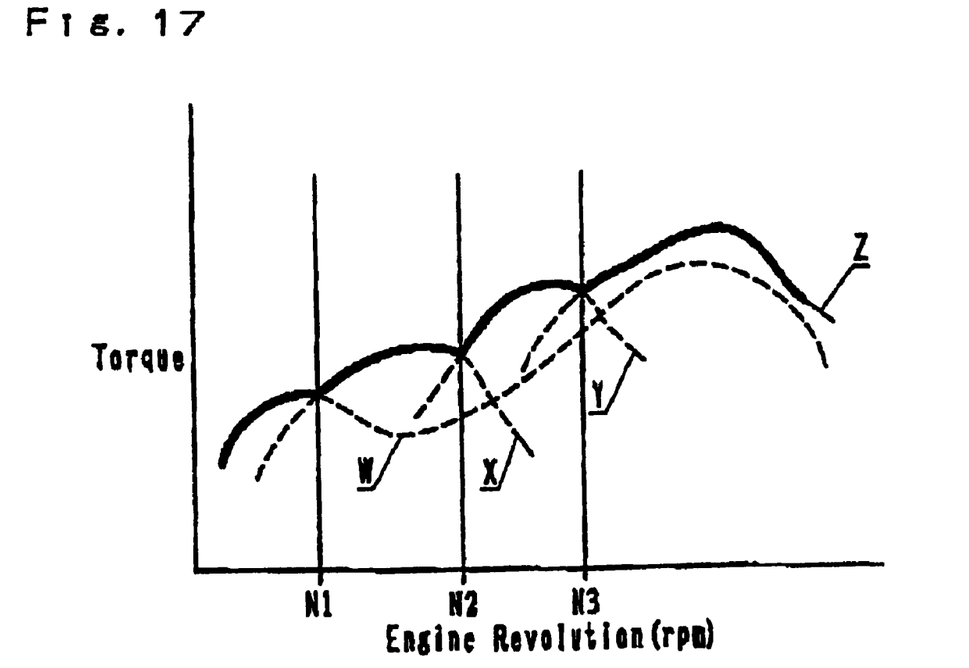
FIG. 17 is a schematic graph showing the relationship between the characteristics of the engine torque and the engine rpm according to the air induction system of the embodiment according to the present invention.

FIG. 17 is a schematic graph showing the relationship between the engine rpm and the output torque.

In FIG. 17, the engine rpm is shown along a horizontal axis and the output torque of the engine is shown along a vertical axis. The relationship between the engine rpm and the output torque of the air induction system shown in FIGS. 13, 14, 15, 16 is illustrated in FIG. 17 as lines W, X, Y, and Z respectively. FIG. 17 includes a first predetermined rpm number N1, a second predetermined rpm number N2, and a third predetermined rpm number N3.

Referring to figures, the operation of the air induction system of the engine of the embodiment of the present invention at lower engine speed, at mid-low engine speed, at mid-high engine speed, and higher engine speed will be explained as follows.

When the engine rpm is less than the first predetermined number N1 (lower engine speed), the actuator 3 is not driven. As shown in FIG. 8, the first switching valve 20 of the air intake system 10 is in the first switching position to form one single air expanding chamber by establishing the communication of the two sections 14a, 14b of the surge tank 14. As shown in FIG. 5, the second switching valve 30 is in the first switching position to block the communication between the branch passages 16a, 16b and the volumetric chamber 40. Accordingly, the air intake system shown in FIG. 13 is formed when the engine rpm is equal to or less than the first predetermined number N1. That is, the air intake system includes the expanded volume formed by the independent air intake passages 12 and the surge tank 14 (functioning as a single air expanding chamber) having a first natural frequency. As shown as W in FIG. 17, when the engine rpm is less than the first predetermined number N1, the first natural frequency of the air intake system and the frequency of the induction air pulsation become resonant to provide the supercharging effect by the interference among the independent air intake passages thereby to obtain the maximum output torque.

When the engine rpm is equal to or more than the first predetermined number N1 and less than the second predetermined number N2 (mid-low engine speed), the first switching valve 20 is rotated by the angle B by the actuator 3 to divide the surge tank 14 into two air intake passages as shown at the position G of FIG. 8. Since the rotational force of the actuator 3 is not transmitted from the first transmitting shaft 25 to the second transmitting shaft 36, the second switching valve 30 remains at the position shown in FIG. 5. That is, the second switching valve 30 is maintained at the fist switching position, wherein the branch passages 16a, 16b function as independent passages. Accordingly, when the engine rpm is equal to or more than the first predetermined number N1 and less than the second predetermined number N2, as shown in FIG. 14, the air induction system of the embodiment of the present invention includes the longest air intake passage in this embodiment and has a second natural frequency. In the engine speed range shown as X in FIG. 17 whose engine rpm is equal to or more than the first predetermined number N1 and less than the second predetermined number N2, the second natural frequency of the air intake system and the frequency of the air induction pulsation become resonant to provide the inertia effect and the resonance effect to obtain the maximum output torque.

When the engine rpm is equal to or more than the second predetermined number N2 and less than the third predetermined number N3 (mid-high revolution speed), the first switching valve 20 is rotated by the angle B to divide the surge tank 14 into two smaller chambers 14a, 14b functioning as first and the second air intake passages as shown at the position H of FIG. 8. Since the rotational force of the actuator 3 is transmitted to the second switching valve 30 via the first transmitting shaft 25 and the second transmitting shaft 36, the second switching valve 30 is moved to the second switching position (shown in FIG. 6) to establish the communication between the first branch passage 16a and the second branch passage 16b via the communication portion 17 and the volumetric chamber 40. Accordingly, as shown in FIG. 15, the air induction system 10 includes an air intake passage shorter than the one in FIG. 14 and longer than the one in FIG., 13 and has a third natural frequency. The air induction system has different natural frequencies based on the number of engine rpm at the low engine speed range and the mid-low engine speed range. As shown as Y in FIG. 17, when the engine rpm is equal to or more than the second predetermined number N2 and less than the third predetermined number N3, the inertia effect and the resonance effect can be obtained to provide the maximum output torque. However, the engine output torque cannot be obtained when the engine rpm is equal to or more than the third predetermined number N3.

When the engine rpm is equal to or more than the third predetermined number N3 (higher engine speed), the first switching valve 20 is rotated by angle B by the actuator 3 to establish the communication of the two sections 14a, 14b of the surge tank 14 as shown at the position J of FIG. 8 to form a single air expanding chamber. As shown in FIG. 12, the rotational force of the actuator 3 is transmitted to the second switching valve 30 via the first transmitting shaft 25 and the second transmitting shaft 36 to rotate the second switching valve 30 by the angle B. As the result, the switching position of the second switching valve 30 is changed to establish communication between the first branch passage 16a and the second branch passage 16b via the communication portion 17 and the volumetric chamber 40. Thus, the air induction system comprises the surge tank 14 (functioning as a single air expanding chamber), the first and the second branch passages 16a, 16b, and the volumetric chamber 40 and includes two short air intake passages having the length of the independent air intake passages 12. In this case, since the volume of the air induction system 10 is expanded to the maximum volume in the embodiment of the present invention, the pumping losses can be reduced and the maximum output torque can be obtained when the engine rpm is equal to or more than the third predetermined number N3 as shown as Z of FIG. 17. Although the engine response may be delayed due to the expanded air volume, the influence thereof can be reduced since the expanded volume of the air induction system is needed only at high engine speed range when the engine rpm is equal to or more than the third predetermined number N3, in other words, when the amount of induction air per time is large.

By obtaining the foregoing effects, the air induction system of the embodiment of the present invention can be structured to have the foregoing characteristics in accordance with the engine rpm by rotating the first and the second switching valves 20, 30 by the actuator 3, which enables the air induction system of the engine to provide an appropriate output torque of the engine and to prevent slow engine response.

The operation of the first switching valve 20 rotated from the position J to the position F as shown in FIG. 8 and the operation of the second switching valve 30 rotated from the position M shown in FIG. 7 to the position K shown in FIG. 5 will be explained referring to FIGS. 4–14.

When a rotational force is generated by the actuator 3 to move the first switching valve 20 from the position J to the position H (shown in FIG. 8), that is to rotate the first transmitting shaft 25 from the position S to the position R (shown in FIG. 12), the first transmitting shaft 25 and the lug 26 are rotated by the angle B to the position R shown in FIG. 11. Accompanying that, the lug 26 (the first transmitting shaft 25) and the contacting portion 37 (the second transmitting shaft 36) keeping in contact with each other are moved together by the biasing force of the return spring 4. When the lug 26 is maintained at the position R by the actuator 3, further rotation of the second transmitting shaft 36 is prevented. This maintains the second transmitting shaft 36 at the position R. Accordingly, in accordance with the rotation of the second transmitting shaft 36, the second switching valve 30 is rotated from the position M (the third switching position shown in FIG. 7) to the position L (the second switching position shown in 6).

When the first transmitting shaft 25 is rotated by the angle B by the actuator 3, the second transmitting shaft 36 is rotated by the biasing force of the return spring 4. The second switching valve 30 is rotated until rotation of the second transmitting shaft 36 by the biasing force of the return spring 4 is prevented by the rotational force of the actuator 3. Thus, the first switching valve 20 is maintained at the position G (the second switching position) and the second switching valve 30 is maintained at the position K (the first switching position).

When the second transmitting shaft 36 reaches the position Q (when the second switching valve 30 comes to the position K), the rotation of the second switching valve 30 is prevented by the stopper 39 as well as the stopper supporting portion 15a to maintain the second transmitting shaft 36 at the initial attaching position (the position Q). Only the first transmitting shaft 25 can be moved to the initial attaching position (the position P) by being rotated through the angle B by the actuator 3. Accordingly, the first switching valve 20 can be rotated to the position F (the first switching position) while the second switching valve 30 is maintained at the position K. Although the second switching valve 30 is rotated by 180 degrees in one direction and rotated in the other direction to return to the initial attaching position in this embodiment, the switching valve 30 may be rotated 360 degrees to return to the initial attaching position.

As described above, according to the embodiment of the present invention, the characteristics of the air induction system such as the dynamic effect of the induction air, the length of the air intake passage necessary for generating the inertia effect and the resonance effect, and the volume of the air expanding chamber, can be varied in accordance with the valve of the engine rpm by controlling the opening and closing of the first and the second switching valves 20, 30. Thus, the air induction system can obtain the maximum dynamic effect of the induction air for broader engine speed range, which leads to an improvement of the engine output performance for broader engine speed.

Although a plurality of switching valves are necessary for varying the characteristics of the air induction system in order to obtain the dynamic effect of the induction air for broader speed range in the conventional air induction system, and a plurality of drive means and control means are necessary due to the use of a plurality of switching valves, according to the embodiment of the present invention, the aforementioned air induction system can be structured by using a single drive means and the control means.

The effects of the embodiment according to the present invention are as follows. The volume of the air induction system can be expanded by providing the second switching valve communicating the branch passages with the volumetric chamber to reduce the pumping losses at high engine speed range. Accordingly, a larger amount of the induction air can be supplied to the cylinders of the engine at high engine speed range, and the output performance of the engine can be improved. In addition, since the volume of the air induction system is not expanded at the other engine speed range which does not require the expansion of the volume of the air induction system, a delay of the engine response can be prevented.

Further effects of the embodiment according to this invention are as follows. By providing the volumetric chamber by utilizing the second switching valve having a hollow cylindrical shape with bottoms in the space between the branch passages which is a dead space in the conventional art, the space in the air induction system can be used effectively. In addition, this structure makes it easier to establish communication between the branch passages and the volumetric chamber. Thus, a second and a third air expanding chamber can be provided with simple structure.

Still further effects of the embodiment according to this invention are as follows. Since the first switching valve and the second switching valve are actuated at a predetermined condition, the opening and the closing of the switching valves can be controlled to form a complicated structure of the air induction system by a single drive means. Accordingly, the air induction system has a plurality of characteristics in accordance with the range of the engine revolution. By varying the natural frequency of the air induction system, the engine rpm valve, which provides the inertia effect and the resonant effect, is changed. Thus, the output performance of the broader engine rpm range can be improved.

The principles, preferred embodiments and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An air induction system for a multi-cylinder engine, comprising:
    a plurality of independent air intake passages in communication with respective cylinders of the engine for supplying induction air thereto;
    a surge tank connected to the independent air intake passages for supplying the induction air to the air intake passages;
    an air induction passage having first and second branch passages each exposed to the atmosphere at one end thereof and connected to the surge tank at another end thereof for inducing the induction air into the surge tank;
    a volumetric chamber disposed between the branch passages;
    a first switching valve disposed in the surge tank for selectively interrupting and establishing fluid communication between first and second sections the surge tank;
    a second switching valve separating the volumetric chamber from the first and second branch passages for selectively interrupting and establishing fluid communication between the volumetric chamber and the first and second branch passages; and
    a drive mechanism common to the first and second switching valves for operating the first and second switching valves in response to the magnitude of engine speed.

2. The air induction system according to claim 1, wherein the second switching valve comprises a hollow cylindrical member having openings provided in a cylindrical surface thereof, and wherein the volumetric chamber is formed in the hollow portion of the cylindrical member.

3. The air induction system according to claim 2, wherein the second switching valve is rotatable about a longitudinal axis of the cylindrical member.

4. The air induction system according to claim 1, wherein the independent air intake passages are grouped into two groups, the intake order of which is not continuous and wherein each section of the surge tank is arranged to be fluidly connected to a respective group of the intake passages, in response to the first switching valve being operated to divide the surge tank into the sections.

5. The air induction system according to claim 1, wherein the drive mechanism includes an actuator, and further comprising:
    a first shaft formed on the first switching valve and connected to the actuator;
    a second shaft formed on the second switching valve;
    a transmitting portion provided between the first shaft and the second shaft for transmitting rotational force from the actuator while providing phase-contrast between the first shaft and the second shaft;
    a biasing means for providing a biasing force opposing the rotational force provided to the second switching valve by the actuator; and
    a stopper for preventing the second switching valve from rotating beyond a predetermined angle;
    wherein the first and second switching valves have respective different opening and closing periods.

6. The air induction system according to claim 1, wherein the surge tank and the air induction passage form a first air expanding chamber for enlarging the volume of the air induction system in accordance with the engine speed.

7. The air induction system according to claim 1, wherein the air induction passage and the volumetric chamber form a second air expanding chamber for enlarging the volume of the air induction system in accordance with the engine speed.

8. The air induction system according to claim 1, wherein the surge tank, the air induction passage, and the volumetric chamber form a third air expanding chamber for enlarging the volume of the air induction system in accordance with the engine speed.

* * * * *